J. I. HOKE.
CULTIVATOR.
APPLICATION FILED SEPT. 26, 1913.
1,104,191.
Patented July 21, 1914.
3 SHEETS—SHEET 1.
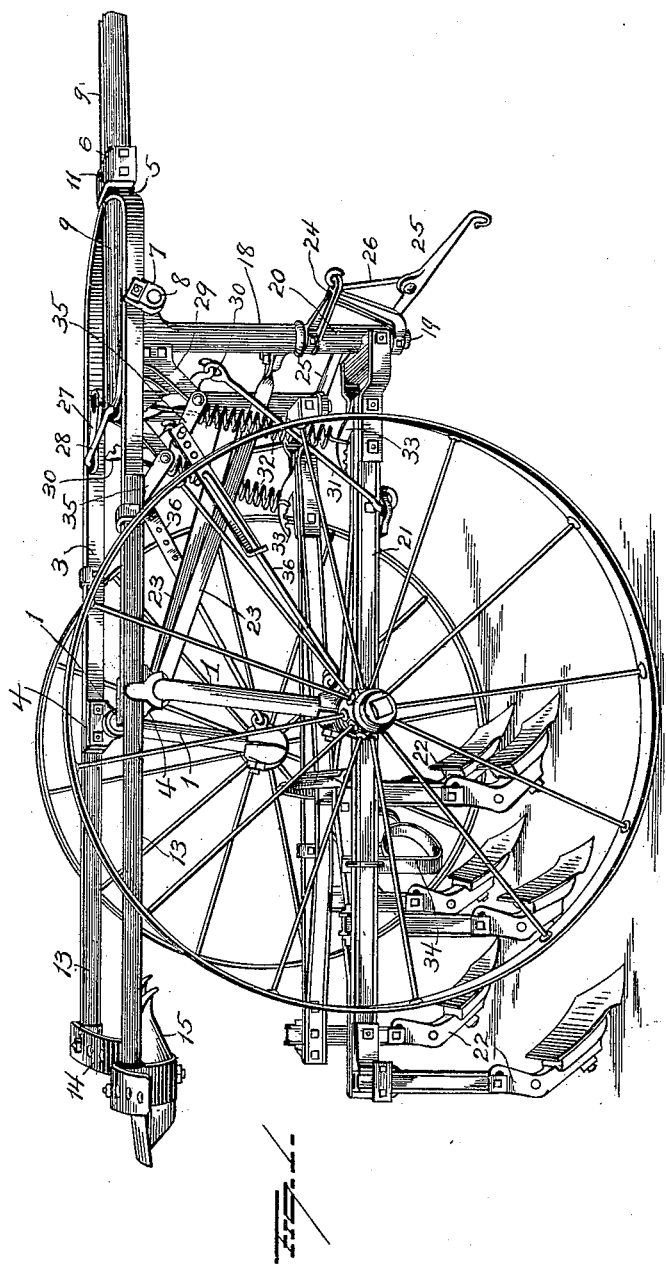
WITNESSES
INVENTOR

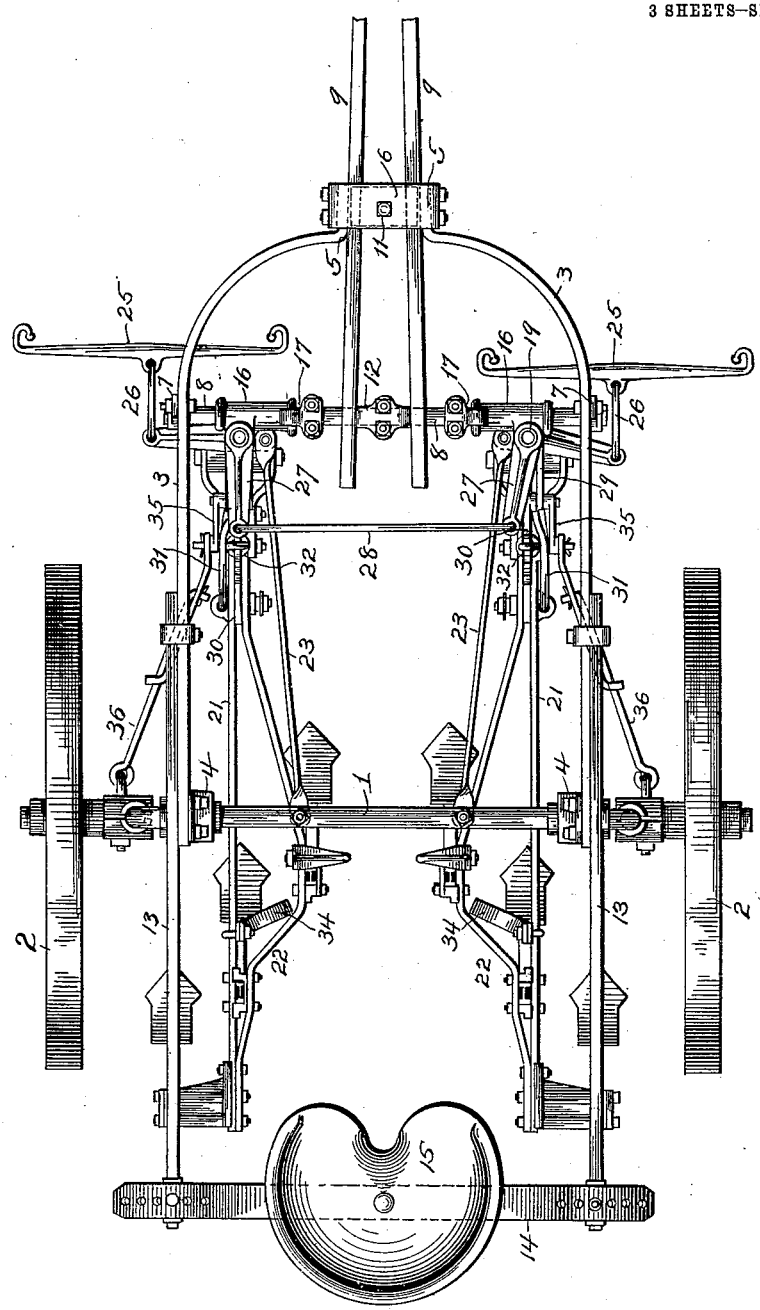

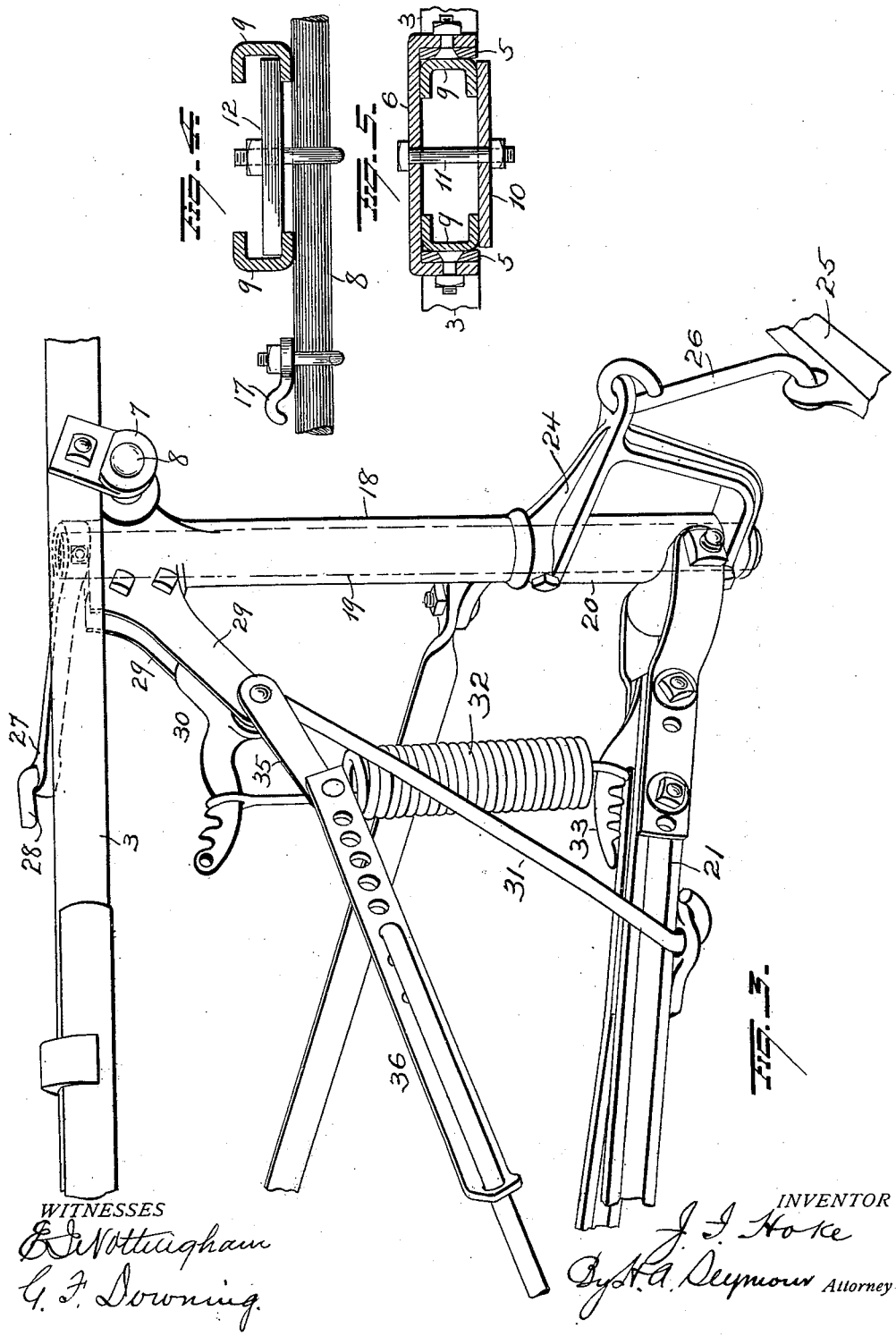

UNITED STATES PATENT OFFICE.

JOHN I. HOKE, OF SOUTH BEND, INDIANA, ASSIGNOR TO OLIVER CHILLED PLOW WORKS, OF SOUTH BEND, INDIANA.

CULTIVATOR.

1,104,191.  Specification of Letters Patent.  Patented July 21, 1914.

Application filed September 26, 1913. Serial No. 791,977.

*To all whom it may concern:*

Be it known that I, JOHN I. HOKE, of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in cultivators,—one object of the invention being to provide simple and effective means for raising the cultivator gangs without the use of hand levers.

A further object is to provide a riding cultivator with spring-actuated lifting means which shall be also operable through intermediate connections, to move the carrying wheels forward when the cultivator gangs are pressed down, and to move said wheels rearwardly when the cultivator gangs are raised.

A further object is to so connect the pole or tongue of a riding cultivator to the frame thereof, that said pole or tongue may be adjusted lengthwise to accommodate the sizes of the draft animals, and thus avoid connecting the harness of the draft animals with the pole or tongue rearwardly of the forward end of the latter.

With these and other objects in view, the invention consists in certain novel features of construction and combinations of parts as hereinafter set forth and pointed out in the claims.

In the accompanying drawings; Figure 1 is a perspective view of a cultivator embodying my improvements; Fig. 2 is a plan view, Fig. 3 is an enlarged side view, showing the lifting mechanism, and portions of the draft devices, and Figs. 4 and 5 are detail sectional views.

1 represents an inverted U-shaped axle provided at its ends with suitable journals mounted in the hubs of carrying wheels 2. A horizontally disposed frame 3 is mounted, through the medium of suitable bearing boxes 4, upon the axle. The frame 3 comprises two members which are bent toward each other at their forward ends and terminate in short forwardly projecting arms 5 disposed parallel with each other and spaced apart, said arms being connected by a flanged plate 6 bolted thereto. Somewhat in rear of the inwardly bent forward ends of the frame members, bearings 7 are secured to the latter for the reception of a cross bar 8 which extends transversely across the forward portion of the frame. A tongue or pole 9 which, in the present instance, may comprise two members, passes between the arms 5 of the frame members and under the plate 6 and the rear portion of said tongue or pole extends over the cross bar 8. The tongue or pole members may be made of metal and are secured to the forward end of the frame by means of a clamp plate 10 which engages the under sides of said pole members and is tightened by means of a bolt 11 passing through the plate 6. The clamping means for the pole to the forward end of the frame thus comprises the plate 6, clamp plate 10 and bolt 11. A clamp 12 is also provided for securing the pole members to the cross bar 8. By loosening the clamp 12 and also the clamping plate 10 at the forward end of the frame, the pole may be adjusted lengthwise to accommodate it to the size of the draft animals to be employed, and thus the inconvenience incident to connecting the harness to the pole rearwardly of its forward end, will be obviated by the lengthwise adjustment of the pole relatively to the cultivator frame. Extension bars 13 may be secured to the parallel members of the frame 3 and made to extend rearwardly therefrom to afford supports for the spring 14 which sustains the seat 15,—which spring may be adjustably connected with said extension bars. Sleeves 16 are mounted upon the cross bar 8 and are adjustable longitudinally thereon, said sleeves being held at any desired adjustment by means of the hooked portions of clips 17 secured to the cross bar and engaging the flanged inner ends of the sleeves. Vertical sleeves 18 (which may be made integral at their upper ends with the horizontal sleeves 16) depend from the sleeves 16, and through each sleeve 18, a rod or shaft 19 passes. The lower ends of the rods 19 project below the lower ends of the sleeves 18 and upon these projecting portions of the rod 19, tubular heads 20 are mounted. To these heads, the forward portions of the beams 21 of shovel gangs 22, are pivotally connected.

In order to insure proper rigidity of the vertical sleeves 18, braces 23 may be provided,—said braces being pivotally connected at their forward ends to lugs on the sleeves 18 near the lower ends of the latter, and connected at their upper forward ends with the frame 3 at the juncture of the axle therewith. A bracket 24 is secured to each vertical rod or shaft 19 at points above and below the tubular heads 20, and with these brackets swingle trees 25 are connected by means of suitable links 26. To the upper ends of the rods or shafts 19, arms 27 are secured and disposed approximately at right angles to the arms or brackets 24 with which the swingle trees are connected. A rod 28 is pivotally connected at its ends with the respective arms 27. It will thus be seen that the rods or shafts 19 mounted in the sleeves 18; the arms or brackets 24, arms 27 and connecting rod 28, constitute an efficient draft-evener. The upper end of each vertical sleeve 18 supports a fixed arm or bracket 29 which projects rearwardly and somewhat downwardly from the sleeve. A bell-crank-lever 30 is pivotally supported by each arm or bracket 29, and one arm of each bell-crank is connected with the beam of one of the shovel gangs, by means of a rod 31,— the connection of the latter with the beam being somewhat rearwardly of the forward mounting of said beam. The other arm of each bell-crank is provided with a plurality of notches, at any one of which, the upper end of a lifting spring 32 is connected, the lower end of each lifting spring being connected with a notched arm 33 secured to the adjacent shovel gang beam forwardly of the connection of the rod 31 therewith. The shovel gangs will preferably be provided with foot pieces 34 within convenient reach of the operator whereby he may press the shovel gangs to operative position or release them from such position. When a shovel gang is permitted to be raised by the action of the lifting spring, the rod 31 will operate to swing the bell-crank until the points of attachment of said rod with the shovel gang will aline with the pivotal support of the bell-crank when the shovel gang will be locked and firmly supported in its elevated position.

In order to keep the machine in proper balance when the cultivator gangs are raised or lowered, it is desirable to shift the wheels backwardly or forwardly. For accomplishing this automatically through the medium of the operation of the raising devices above described, the devices now to be explained are employed. To each bell-crank 30, or preferably to the pivot pin with which the bell crank moves, one end of a short arm 35 is secured. The other end of each arm 35 is pivotally attached to a pitman 36 (preferably made in two parts adjustably connected together), and the other end of each pitman is connected with the U-axle near the wheel mountings. With such construction when the shovel gangs are raised, motion will be imparted to the axle to swing the latter and move the ground wheels rearwardly where they will be more nearly under the center of the load, and when the gangs are pressed downwardly, motion will be imparted to the axle to swing it and move the ground wheels forwardly so that they will then support more of the forward portion of the frame. It will be observed that by adjusting the horizontal sleeves 16 on the cross bar 8, the spacing of the shovel gangs may be adjusted.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a frame, an inverted U-shaped axle pivotally connected therewith, ground wheels, and a beam, of automatic beam-raising mechanism supported by the frame, and means connecting the axle with said raising mechanism to shift said axle when the raising mechanism operates.

2. The combination with an inverted U-shaped axle, ground wheels, a frame and a beam connected with the frame, of a bell-crank supported by the frame, a rod connecting one arm of the bell-crank with the beam, a spring connecting the other arm of the bell-crank with the beam, an arm movable with said bell-crank and a pitman connecting said last-mentioned arm with the axle for swinging the latter when the bell-crank operates.

3. The combination with an inverted U-shaped axle, ground wheels, and a frame, of vertical sleeves supported by the frame, rods passing through said sleeves, cultivator gangs, mounting for said cultivator gangs on said rods, bell-cranks supported by said sleeves, a spring connecting one arm of each bell-crank with a cultivator gang, a rod connecting the other arm of each bell-crank with the same cultivator gang, and means connecting said bell-cranks with the axle.

4. The combination with an axle, ground wheels, a frame mounted on the axle, and a cross bar on the frame, of sleeves mounted on the cross bar and adjustable lengthwise thereon, vertical sleeves depending from the horizontal sleeves, rods passing through the vertical sleeves, cultivator gangs having mounting on said rods, raising mechanism mounted on said vertical sleeves and connected with the cultivator gangs, arms secured to the lower portions of said rods, arms secured to the upper ends of said rods, and a rod connecting the upper arms.

In testimony whereof, I have signed this specification in the presence of two subscribing witnesses.

JOHN I. HOKE.

Witnesses:
  JENNIE DAVIS,
  THOS. A. FREEMAN.

Copies of this patent may be obtained for five cents each, by addressing the "Commissioner of Patents, Washington, D. C."